United States Patent
Yang et al.

(10) Patent No.: US 12,172,348 B2
(45) Date of Patent: Dec. 24, 2024

(54) COMPRESSION MOLDING DIE FOR I-SHAPED PART

(71) Applicant: Nanjing Comptech Composites Corp., JiangNing (CN)

(72) Inventors: Wenguang Yang, Jiangning (CN); Keyuan Sun, Jiangning (CN); Peimin Chen, Jiangning (CN); Yu Jin, Jiangning (CN); Zhaoxi Chen, Jiangning (CN); Xiaogang Wang, Jiangning (CN); Yan Xia, Jiangning (CN); Feng Lin, Jiangning (CN); Xiaochun Chen, Jiangning (CN)

(73) Assignee: Nanjing Comptech Composites Corp. (CN)

( * ) Notice: Subject to any disclaimer, the term of this patent is extended or adjusted under 35 U.S.C. 154(b) by 399 days.

(21) Appl. No.: 17/620,140

(22) PCT Filed: Sep. 9, 2020

(86) PCT No.: PCT/CN2020/114270
§ 371 (c)(1),
(2) Date: Dec. 17, 2021

(87) PCT Pub. No.: WO2021/057484
PCT Pub. Date: Apr. 1, 2021

(65) Prior Publication Data
US 2022/0250287 A1    Aug. 11, 2022

(30) Foreign Application Priority Data

Sep. 25, 2019  (CN) .......................... 201910912934.5
Sep. 25, 2019  (CN) .......................... 201910913895.0
Sep. 25, 2019  (CN) .......................... 201921613424.X (51) Int. Cl.
*B29C 43/36* (2006.01)
*B22F 3/03* (2006.01)
(Continued)

(52) U.S. Cl.
CPC .............. *B29C 43/361* (2013.01); *B22F 3/03* (2013.01); *B29C 43/006* (2013.01); *B29C 43/04* (2013.01);
(Continued)

(58) Field of Classification Search
CPC ......... B22F 3/03; B29C 43/006; B29C 43/42; B29C 43/36; B29C 43/361
See application file for complete search history.

(56) References Cited

U.S. PATENT DOCUMENTS 3,140,327 A * 7/1964 Dettmer ................ B29C 43/006
156/289
4,102,966 A * 7/1978 Duperray .............. B29C 43/006
264/266
(Continued)

FOREIGN PATENT DOCUMENTS

CN    202155984 U    3/2012
CN    202283598 U    6/2012
(Continued)

OTHER PUBLICATIONS

Machine translation of CN207952628U, Jan. 8, 2018 (Year: 2018).*
(Continued)

*Primary Examiner* — Benjamin A Schiffman (57) ABSTRACT

Provided is a compression molding die. The die can be used for compression molding an I-shaped part without the need for machining. The molding die comprises: an outer mold with an inner diameter of d; an upper pressing disc, a lower pressing disc and a huff mold with the same outer diameter of d and the same inner diameter of f; an upper mold; a lower (Continued)

mold; and a core mold with a diameter of h. The upper pressing disc, the huff mold and the lower pressing disc, which are movable vertically, are arranged in the outer mold in a vertically spaced manner; the vertically movable upper mold extends into the upper pressing disc, and the vertically movable lower mold extends into the lower pressing disc; the outer mold, the upper mold, the upper pressing disc, the huff mold, the lower pressing disc and the lower mold define a cavity.

2 Claims, 8 Drawing Sheets

(51) Int. Cl.
*B29C 43/00* (2006.01)
*B29C 43/04* (2006.01)
*B29C 43/42* (2006.01)
B29K 27/18 (2006.01)
B29K 105/00 (2006.01)
B29L 31/00 (2006.01)

(52) U.S. Cl.
CPC ...... *B29C 43/42* (2013.01); *B29C 2043/3615* (2013.01); *B29C 2043/3621* (2013.01); *B29C 2043/3623* (2013.01); *B29C 2043/3626* (2013.01); *B29C 2043/3628* (2013.01); *B29K 2027/18* (2013.01); *B29K 2105/251* (2013.01); *B29L 2031/772* (2013.01)

(56) References Cited

U.S. PATENT DOCUMENTS

| | | | |
|---|---|---|---|
| 4,707,314 A | | 11/1987 | Nobuo et al. |
| 7,959,837 B2 * | | 6/2011 | Andrews ................. H01M 4/10 |
| | | | 264/109 |
| 2022/0250287 A1 * | | 8/2022 | Yang ....................... B29C 43/04 |

FOREIGN PATENT DOCUMENTS

| | | | | |
|---|---|---|---|---|
| CN | 203579982 U | | 5/2014 | |
| CN | 204108865 U | * | 1/2015 | |
| CN | 207952628 U | | 10/2018 | |
| CN | 106891279 B | | 3/2019 | |
| CN | 208619933 U | | 3/2019 | |
| CN | 110576549 A | * | 12/2019 | ............ B29C 43/36 |
| CN | 210820540 U | * | 6/2020 | ............ B29C 43/36 |
| CN | 111589589 A | | 8/2020 | |
| CN | 212008050 U | * | 11/2020 | |
| CN | 212008051 U | * | 11/2020 | |
| CN | 110722726 B | * | 12/2020 | ............ B29C 43/02 |
| JP | 068266 A | | 1/1994 | |
| JP | 07258704 A | * | 10/1995 | |
| JP | 0976259 A | | 3/1997 | |
| JP | 3389332 B2 | * | 3/2003 | |
| JP | 2008302426 A | | 12/2008 | |
| JP | 2016107269 A | | 6/2016 | |

OTHER PUBLICATIONS

Machine translation of CN204108865U, Jul. 29, 2014 (Year: 2014).*
Machine translation of CN203579982U, Sep. 23, 2013 (Year: 2013).*
Machine translation of JPH07329092A, Mar. 24, 1994 (Year: 1994).*

* cited by examiner

COMPRESSION MOLDING DIE FOR I-SHAPED PART

CROSS REFERENCE OF RELATED APPLICATION

This is a U.S. National Stage under 35 U.S.C 371 of the International Application PCT/CN2020/114270, filed Sep. 9, 2020, which claims priority under 35 U.S.C. 119(a-d) to CN 2019109129345, filed Sep. 25, 2019, to CN 201921613424X, filed Sep. 25, 2019, and to CN 2019109138950, filed Sep. 25, 2019.

BACKGROUND OF THE PRESENT INVENTION

Field of Invention

The invention relates to a compression molding die for molding parts with a certain shape by compression of powder, for example, polytetrafluoroethylene powder.

Description of Related Arts

An I-shaped part usually comprises a middle shaft, an upper wing plate and a lower wing plate; the middle shaft has an outer diameter f and a height e; and each of the upper wing plate and the lower wing plate has a diameter d and a height g; and, d is greater than f. It is difficult to mold I-shaped part by compression at once. A molding method for the I-shaped part usually includes two steps; at a first step, raw materials such as powder are compressed into a cylinder; and at a second step, the formed cylinder is machined to mill off excessive materials between the upper and lower wing plates until the diameter of the milled portion is equal to f, thereby obtaining the I-shaped part.

Such machining method is time-consuming, and wastes a lot of materials as excessive materials are milled off, in particular when the outer diameter f of the middle shaft is greatly different from the diameter d of the each of the upper and lower wing plates or when the height e of the middle shaft is relatively great.

SUMMARY OF THE INVENTION

An objective of the invention is to provide a compression molding die for I-shaped part. The mold die can be used to compress an I-shaped parts without machining, the production efficiency is high, and the waste of raw materials is not caused.

The invention provides a compression molding die for I-shaped part. The I-shaped part comprises a middle shaft, an upper wing plate and lower wing plate; the middle shaft has an outer diameter f and a height e; each of the upper wing plate and the lower wing plate has a diameter d and a height g; and, d is greater than f. The molding die comprises: an outer mold with an inner diameter d, an upper pressing disc, a lower pressing disc, a huff mold, an upper mold and a lower mold, wherein each of the upper pressing disc, the lower pressing disc and the huff mold has an outer diameter d and an inner diameter f; the upper pressing disc, the huff mold and the lower pressing disc are vertically arranged in the outer mold at an interval; the upper mold extends into the upper pressing disc; the lower mold extends into the lower pressing disc; and a mold cavity is surrounded by the outer mold, the upper mold, the upper pressing disc, the huff mold, the lower pressing disc and the lower mold.

The invention has the following beneficial effects: the compression molding method for pressing I-shaped part using the compression molding die includes the following steps:

1): filling raw materials for compressing the I-shaped part in the mold cavity;

2): moving the upper mold downward and the lower mold upward while keeping the outer mold, the upper pressing disc and the lower pressing disc motionless until a lower surface of the upper mold is leveled with a lower surface of the upper pressing disc and an upper surface of the lower mold is leveled with an upper surface of the lower pressing disc; and 3): moving the upper mold and the upper pressing disc downward together and the lower mold and lower pressing disc upward together at the same time while keeping the outer mold motionless until reaching a required size of the I-shaped part.

The upper mold that can move up and down moves down, and lower mold that can move up and down moves up, materials located below the lower surface of the upper mold and materials located above the upper surface of the lower mold can be subjected to first extrusion toward the middle shaft of the I-shaped part; the upper mold that can move up and down moves down together with the upper pressing disc, and the lower mold that can move up and down moves up together with the lower pressing disc, materials located below the lower surface of the upper pressing disc can be subjected to extrusion toward the upper wing plate of the I-shaped part, materials located above the upper surface of the lower pressing disc can be subjected to extrusion toward the lower wing plate of the I-shaped part, and at the same time, materials located below the lower surface of the upper mold and materials located above the upper surface of the lower mold can be subjected to second extrusion toward the middle shaft of the I-shaped part. Thus, it can be ensured that the density all over the I-shaped part molded by compression is consistent, and in particular the densities of the upper and lower wings are consistent with the density of the middle shaft, so that the I-shaped part is homogeneous. Such method also saves the conventional step of machining the cylindrical compressed piece to obtain the I-shaped part, is time-saving and labor-saving, and avoids wasting raw materials.

The huff mold belongs to prior art. The huff mold is composed of two symmetrical semi-ring molds.

When using this compression molding die to press I-shaped part, there is step 4) after step 3), 4): moving the upper mold, the upper pressing disc, the huff mold, the lower mold and the lower pressing disc together upward relative to the outer mold to drive the I-shaped part to be exposed out of the outer mold; taking down the upper mold and the upper pressing disc first, then taking down the huff mold and the I-shaped part at the same time, and finally taking down the huff mold to obtain the I-shaped part, or taking down the huff mold first and then taking down the I-shaped part. The huff mold is usually taken down by a method of moving two half-ring molds along the radial direction of the huff mold.

According to the compression molding die for I-shaped part, the I-shaped part has a core hole which runs through the middle shaft, the upper wing plate and the lower wing plate and has a diameter h; and the molding die further comprises a core mold with a diameter h, and upper and lower ends of the core mold respectively extend into holes formed on the upper mold and the lower mold.

In this way, the I-shaped part molded by compression has a through core hole in the middle.

When using this compression molding die to press I-shaped part with a core hole in the middle, there is step 4) after step 3), 4): moving the upper mold, the upper pressing disc, the huff mold, the lower mold, the lower pressing disc and the core mold together upward relative to the outer mold to drive the I-shaped part to be exposed out of the outer mold; taking down the upper mold and the upper pressing disc first, then taking down the huff mold and the I-shaped part at the same time, and finally taking down the huff mold to obtain the I-shaped part, or taking down the huff mold first and then taking down the I-shaped part. Under such circumstance, since the molding die comprises the core mold inside, to take down the upper mold, the upper pressing disc and the I-shaped part, such three pieces are usually moved upward along the axial direction of the core mold, and then can be taken down from an upper end of the core mold.

According to the compression molding die for I-shaped part, if a compression ratio for compression molding of raw materials is x, and x is greater than 1, the distance between the lower surface of the upper mold and the lower surface of the upper pressing disc is $e(x-1)/2$, the distance between the upper surface of the lower mold and the upper surface of the lower pressing disc is $e(x-1)/2$;

the distance between the lower surface of the upper pressing disc and the upper surface of the huff mold is $g(x-1)$, the distance between the upper surface of the lower pressing disc and the lower surface of the huff mold is $g(x-1)$.

Use this compression molding die to press I-shaped parts, for step 2), when the outer mold, the upper pressing disc and the lower pressing disc are kept are kept motionless, the upper mold is moved downward by a distance $e(x-1)/2$, and the lower mold is moved upward by a distance $e(x-1)/2$. At this time, the lower surface of the upper mold is leveled with the lower surface of the upper pressing disc, and the upper surface of the lower mold is leveled with the upper surface of the lower pressing disc; and Use this compression molding die to press I-shaped parts, for Step 3), when the outer mold is kept motionless, the upper mold and the upper pressing disc are moved downward together by a distance $g(x-1)$, and the lower mold and lower pressing disc are moved upward together by a distance $g(x-1)$ at the same time, so as to reach the required size of the I-shaped part.

In this way, the homogeneity of the inner texture of the I-shaped part molded by compression can be further ensured.

According to the compression molding die for I-shaped part, the periphery of the lower end of the upper mold is step-shaped, an axle journal with a smaller diameter at the lower end of the upper mold extends in the upper pressing disc; the periphery of the upper end of the lower mold is step-shaped, and an axle journal with a small diameter at the upper end of the lower mold extends in the lower pressing disc;

the distance between the step face of the upper mold and the upper surface of the upper pressing disc is $e(x-1)/2$, the distance between the step face of the lower mold and the lower surface of the lower pressing disc is $e(x-1)/2$.

Use this compression molding die to press I-shaped parts, for Step 2), when the outer mold, the upper pressing disc and the lower pressing disc are kept motionless, and the upper mold moves downward until the lower surface of the upper mold is leveled with the lower surface of the upper pressing disc, a step face of the upper mold contacts the upper surface of the upper pressing disc; and when the lower mold moves until the upper surface of the lower mold is leveled with the upper surface of the lower pressing disc, a step face of the lower mold contacts the lower surface of the lower pressing disc.

The molding die with such structure more easily ensure the downward movement distance of the upper mold prior to the contact between the step face of the upper mold and the upper surface of the upper pressing disc, and the upward movement distance of the lower mold prior to the contact between the step face of the lower mold and the lower surface of the lower pressing disc, and after the upper surface of the upper pressing disc is in contact with the step face of the upper mold, and the lower surface of the lower pressing disc is in contact with the step face of the lower mold, ensure that the lower mold moves upward to drive the lower pressing disc to move upward and that the upper mold moves downward to drive the upper pressing disc to move downward, thereby further simplifying the structure.

The compression molding die of the structure is placed on a press, the upper pressing rod moving up and down of the press is connected with the upper mold, the lower ejector rod moving up and down of the press is connected with the lower mold, when the outer mold, the upper pressing disc and the lower pressing disc all are kept motionless, the upper mold is driven to move downward by an upper pressing rod which is connected to the upper end of the upper mold and moves up and down, and the lower mold is driven to move upward by a lower ejecting rod which is connected to the lower end of the lower mold and moves up and down;

When the upper mold moves downward until its step surface is in contact with the upper surface of the upper pressing disc, and the lower mold moves upward until its step surface is in contact with the lower surface of the lower pressing disc, while the outer mold remains stationary, the upper mold and the upper pressing disc are driven to move downward together by the upper pressing rod, and the lower mold and the lower pressing disc are driven to move upward together by the lower ejecting rod.

Thus, the upper mold or the upper mold and the upper pressing disc can be driven to move by only one upper pressing rod, and the lower mold or the lower mold and the lower pressing disc can be driven to move by only one lower ejecting rod, so that control is easier, and the structure is simpler.

According to the compression molding die for I-shaped part, a plurality of support rings which are nested in turn are provided; an annular slot is formed at an upper end of the inner circumference of each of the support rings; the support ring with a smaller diameter is nested in the annular slot of the support ring with a greater diameter; the lower pressing disc is located in the annular slot of the support ring with the smallest diameter; an axle journal with a greater diameter at the lower end of the lower mold penetrates through the support ring with the smallest diameter, and the support ring with the greatest diameter is arranged on a mold rack.

Thus, such molding molds can be used to compress I-shaped part with different outer diameters, and has certain universality and interchangeability. For example, for an I-shaped part with a relatively great diameter d, the outer mold, huff mold, lower pressing disc and upper pressing disc which respectively have a relatively great diameter are correspondingly required. Under such circumstance, it only needs to remove the support rings with a relatively small diameter and place the lower pressing disc with a relatively great size in the annular slot of the support ring with a relatively great diameter.

Reference of numerals: 1: I-shaped part; 10: raw material: 11: middle shaft; 12: upper wing plate; 13: lower wing plate; 2: outer mold; 3: upper pressing disc; 4: lower pressing disc; 5: huff mold; 6: upper mold; 61: upper mold axle journal; 7: lower mold; 71: lower mold axle journal; 8: core mold; 9: mold cavity; 20: press; 21: mold rack; 22: support ring; 23: ejector block; 24: cushion block; 25: workbench; 26: upper pressing rod; 27: lower ejecting rod.

DETAILED DESCRIPTION OF THE EMBODIMENTS

Figure 8:
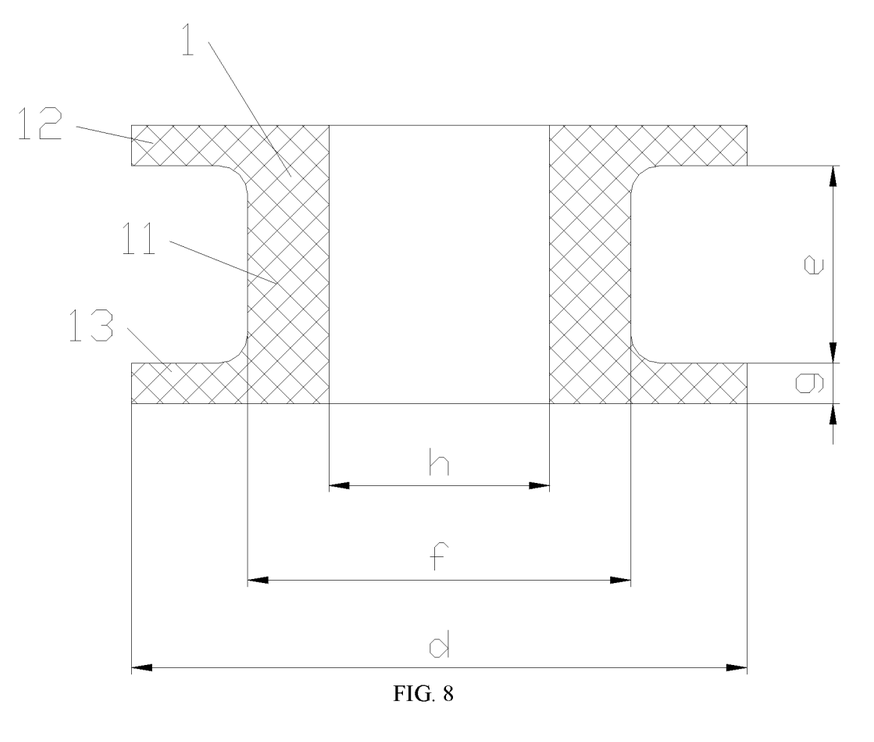
FIG. 8 is a schematic diagram of an I-shaped part formed by compression.

Referring to FIG. 8, an I-shaped part 1 which needs to be molded by compression of raw materials such as polytetrafluoroethylene powder comprises a middle shaft 11, an upper wing plate 12 and a lower wing plate 13; and the I-shaped part has a vertically through core hole 14 with a diameter h. The middle shaft has an outer diameter f and a height e; and each of the upper wing plate and the lower wing plate has a diameter d and a height g; and, d is greater than f.

Figure 4:
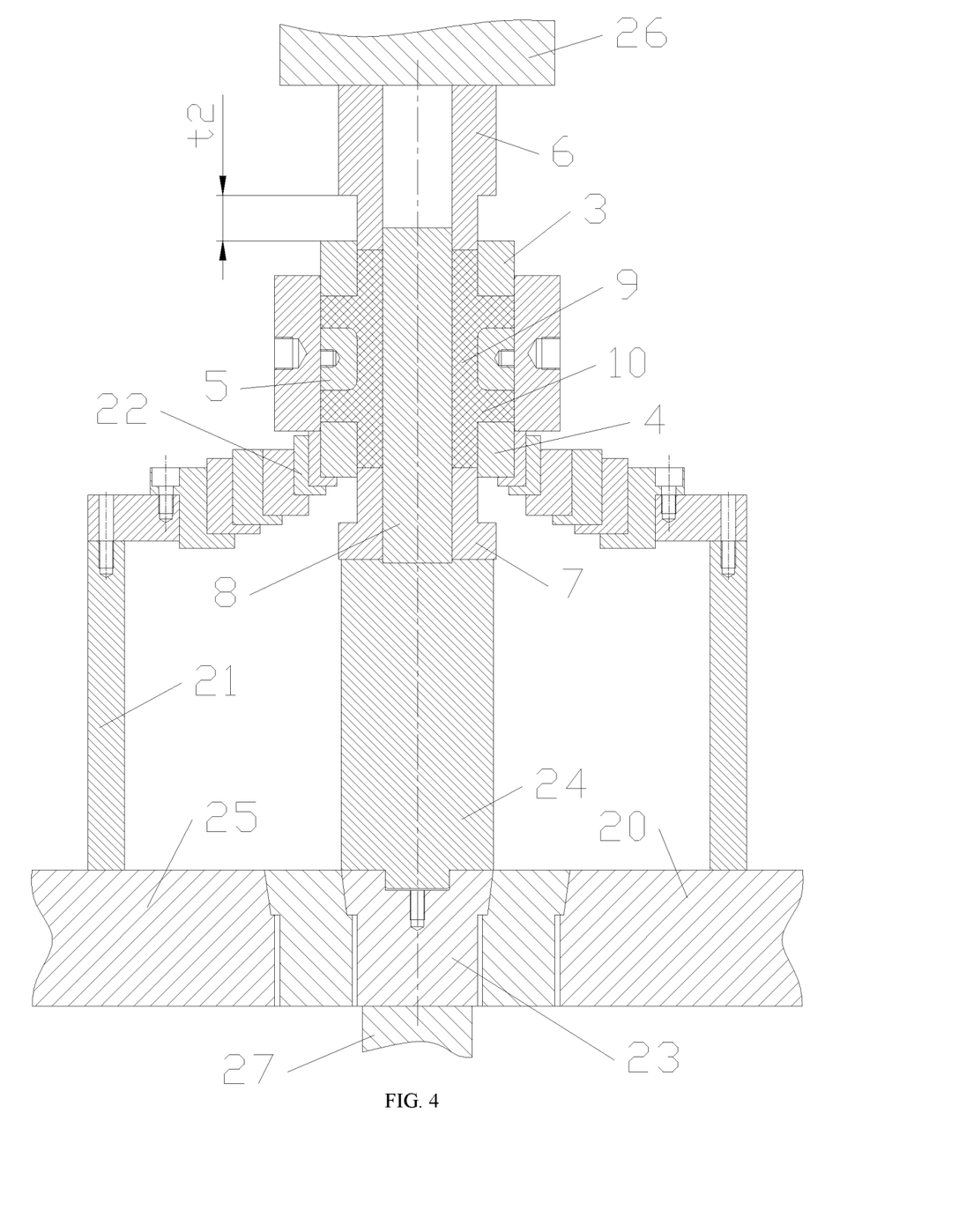
FIG. 4 is a schematic diagram of molding die prior to primary compression.
Figure 6:
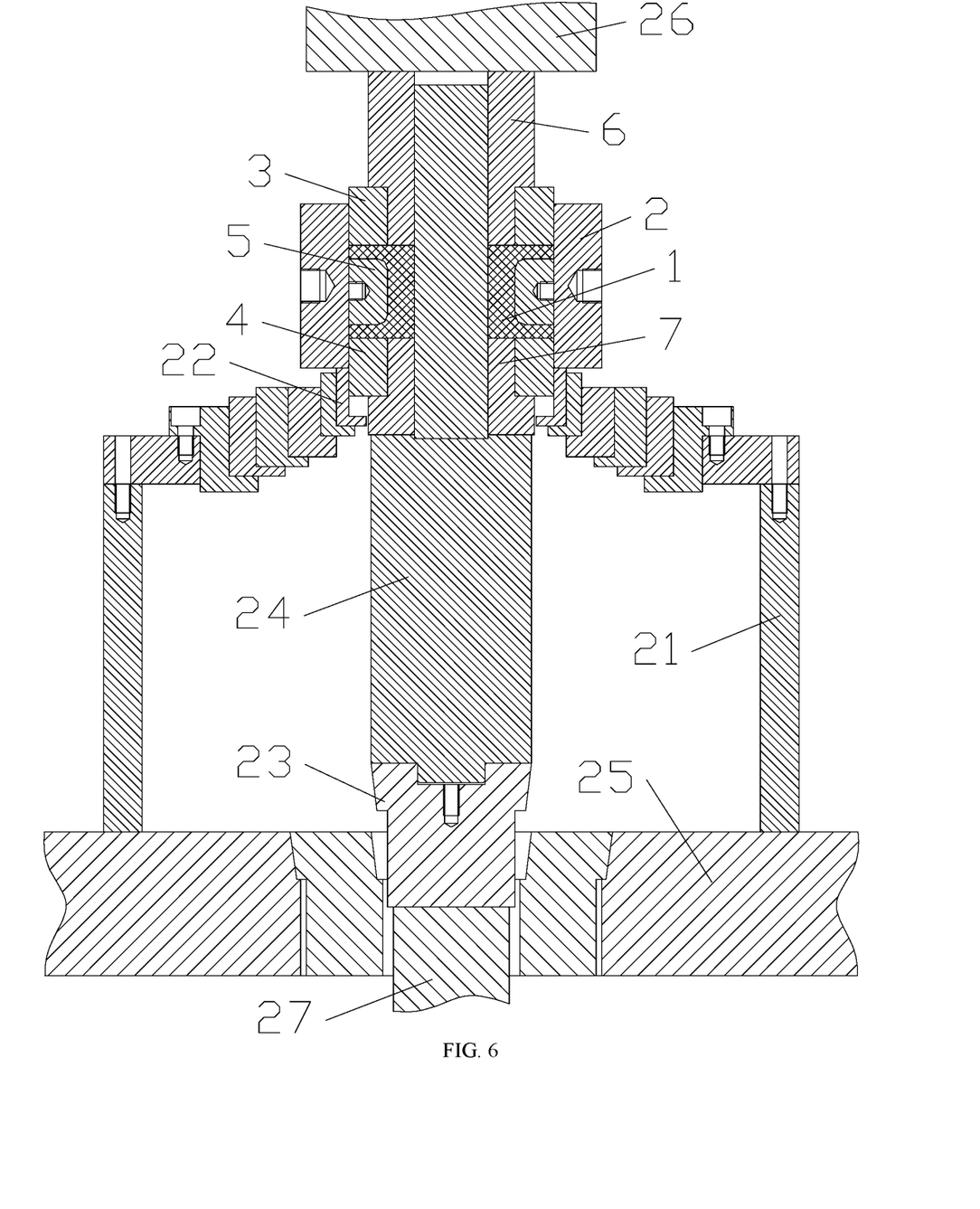
FIG. 6 is a schematic diagram of molding die after compression (during pressure maintaining)

To compress the I-shaped part, referring to FIGS. 4, 6, and 8, molding die used comprises: an outer mold 2 with an inner diameter d, an upper pressing disc 3, a lower pressing disc 4, a huff mold 5 (composed of two semi-ring molds), an upper mold 6, a lower mold 7 and a core mold 8 with a diameter h, wherein each of the upper pressing disc, the lower pressing disc and the huff mold has an outer diameter d and an inner diameter f.

A through-hole with a diameter h penetrates through the center of each of the upper mold 6 and the lower mold 7, and upper and lower ends of the core hold respectively extend into the through-holes of the upper mold and the lower mold. The periphery of the lower end of the upper mold is step-shaped, and the upper pressing disc 3 is nested on an upper mold axle journal 61 with a smaller diameter at the lower end of the upper mold. The periphery of the upper end of the lower mold 7 is step-shaped, and the lower pressing disc is nested on a lower shaft axle journal 71 with a small diameter at the upper end of the lower mold. The upper shaft axle journal 61 and the lower mold axle journal 71 respectively have an outer diameter f.

The upper pressing disc, the huff mold and the lower pressing disc are vertically arranged in the outer mold at an interval, and a mold cavity 9 is surrounded by the outer mold, the upper mold, the upper pressing disc, the huff mold, the lower pressing disc, the lower mold, and the core mold.

To place the molding die on a press 20, a mold rack 21 is arranged on a workbench 25 of the press, and the mold rack is provided with a plurality of support rings 22. An upper pressing rod 26 which is connected to the upper mold is arranged above the upper mold 6. A cushion block 24 is arranged between an ejector block 23 of the workbench and each of the core mold 8 and the lower pressing disc 4, and a lower ejecting rod 27 for ejecting the ejector bock 23 is located below the ejector block 23.

The plurality of support rings 22 are nested in turn, which means that an annular slot is formed at an upper end of the inner circumference of each of the support rings, and the support ring with a smaller diameter is located in the annular slot of the support ring with a greater diameter. The lower pressing disc 4 is located in the annular slot of the support ring with the smallest diameter; an axle journal with a greater diameter at the lower end of the lower mold penetrates through the support ring with the smallest diameter, and the support ring with the greatest diameter is arranged on the mold rack.

A compression molding method for I-shaped part molded by compression of raw materials such as the polytetrafluoroethylene powder at a compression ratio x includes the following steps:

1), Material filling (raw materials for compressing the I-shaped part are filled in the mold cavity). The specific process is as follows.

Figure 1:
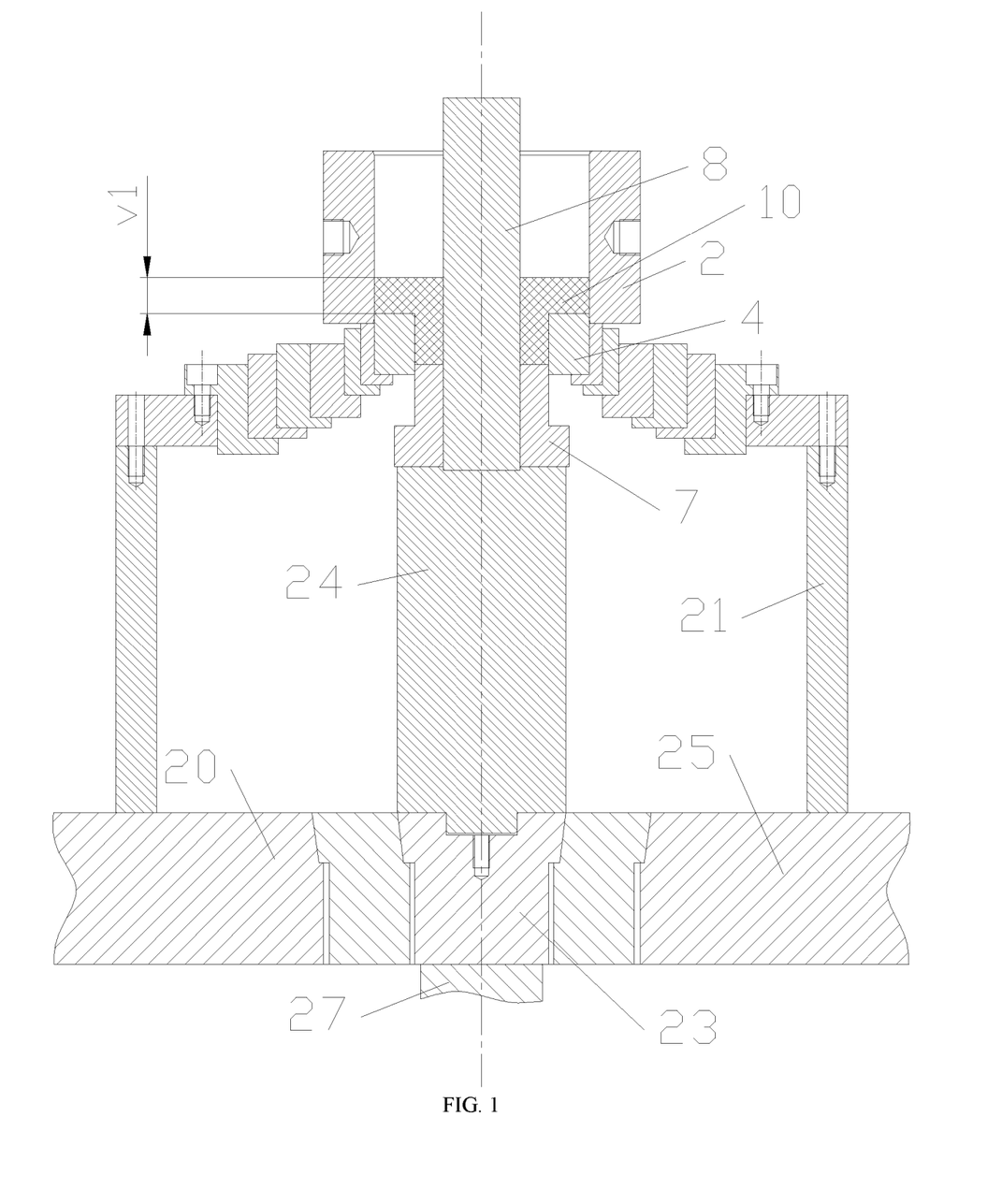
FIG. 1 is a schematic diagram of molding die used for material filling at a first time.

Material filling for the first time: Refer to FIG. 1. The mold rack is fixed on the workbench; the plurality of support rings are nested in turn; the support ring with the greatest diameter is fixed on the mold rack; the lower pressing disc is placed in the annular slot of the support ring with the smallest diameter; and the lower surface of the outer mold located on the outer periphery of the lower pressing disc contacts the upper surface of the support ring with the smallest diameter. The lower mold axle journal with a smaller diameter of the lower mold extends into the lower pressing disc, and the outer diameter of the axle journal with a greater diameter at the lower end of the lower mold is smaller than the inner diameter of the support ring with the smallest diameter. The distance t1 from the step face of the lower mold to the lower surface of the lower pressing disc is equal to $e(x-1)/2$. The distance u1 from the upper surface of the lower mold to the upper surface of the lower pressing disc is equal to t1. The core mold penetrates through the lower mold; the cold mold and the lower mold both are located on the cushion block; and a lower end of the cushion block contacts the ejector block.

Raw materials 10 such as the polytetrafluoroethylene powder are placed in a space surrounded by the outer mold, the lower pressing disc, the lower mold, the core mold, etc. for the first time, and after material filling for the first time, the distance v1 from the material surface to the upper surface of the lower pressing disc is gx.

Figure 2:
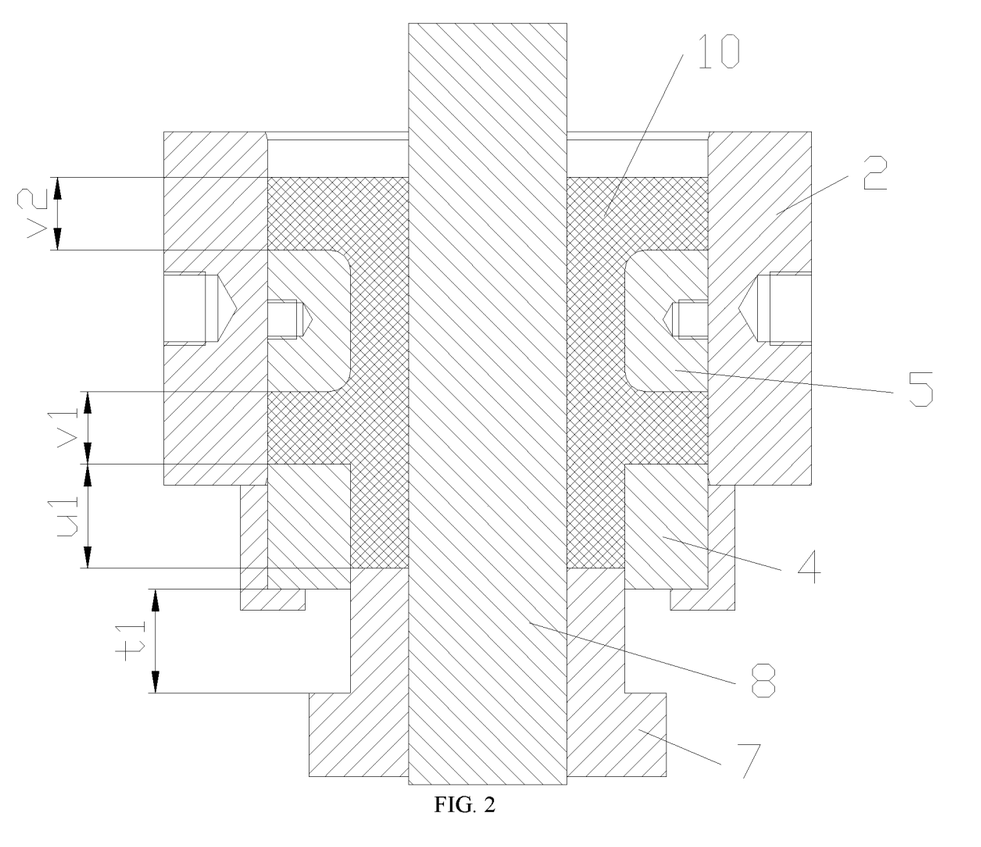
FIG. 2 is a schematic diagram of some of molding die used for material filling at a second time.

Material filling for the second time: the huff mold is placed in the outer mold, and at this time, the lower surface of the huff mold is superimposed with the material surface after material filling for the first time.

Refer to FIG. 2. Raw materials 10 such as the polytetrafluoroethylene powder are placed in a space surrounded by the outer mold, the lower pressing disc, the lower mold, the core mold, the huff mold, etc. for the second time, and after material filling for the second time, the distance v2 from the material surface to the upper surface of the huff mold is gx.

Figure 3:
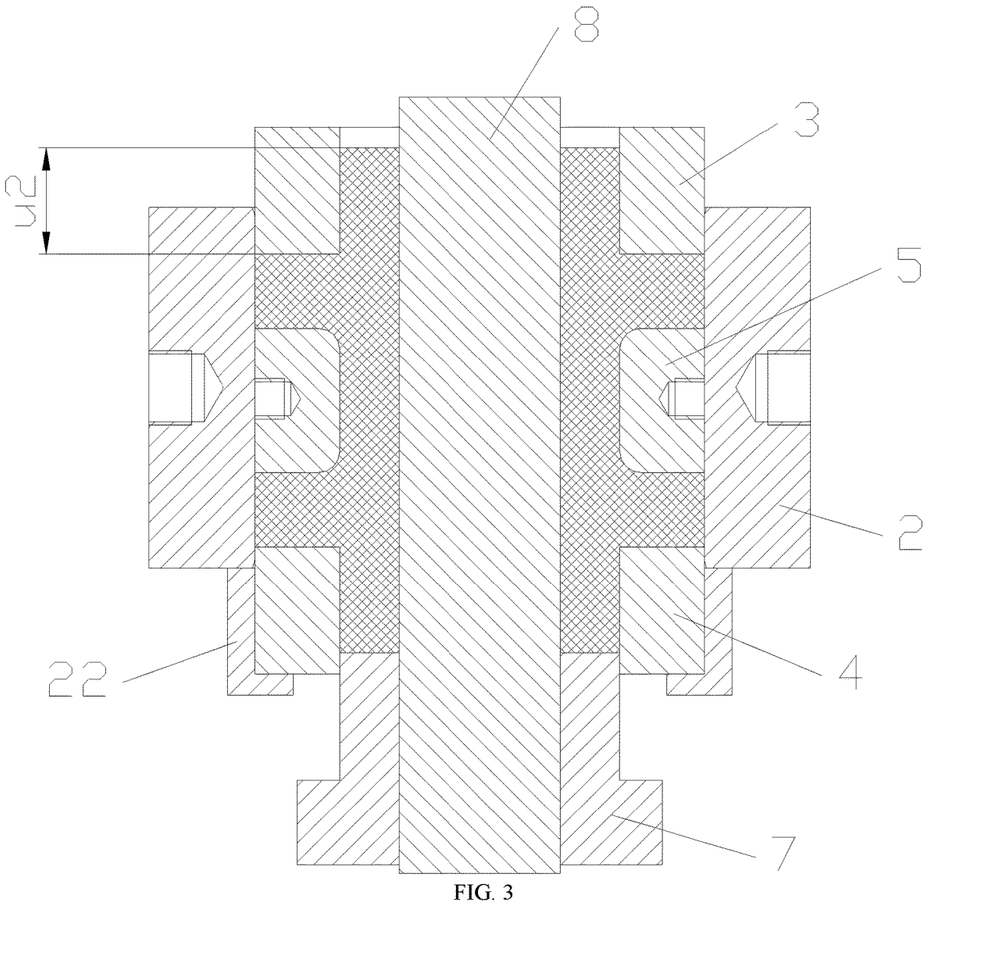
FIG. 3 is a schematic diagram of some of molding die used for material filling at a third time.

Material filling for the third time: the upper pressing disc is placed in the outer mold, and at this time, the lower surface of the upper pressing disc is superimposed with the material surface after material filling for the second time.

Refer to FIG. 3. Raw materials 10 such as the polytetrafluoroethylene powder are placed in a space surrounded by the outer mold, the lower pressing disc, the lower mold, the core mold, the huff mold, the upper pressing disc, etc. for the third time, and after material filling for the third time, the distance u2 from the material surface to the lower surface of the upper pressing disc is u1.

The upper mold axle journal with a smaller diameter of the upper mold extends into the upper pressing disc, and at the same time, the core mold extends into the through-hole of the upper mold. The lower surface of the upper mold is superimposed with the material surface after material filling for the third time. The distance t2 from the step face of the upper mold to the upper surface of the upper pressing disc is equal to t1. The upper end of the upper mold is connected to the upper pressing rod of the press.

2), Primary Compression

Figure 5:
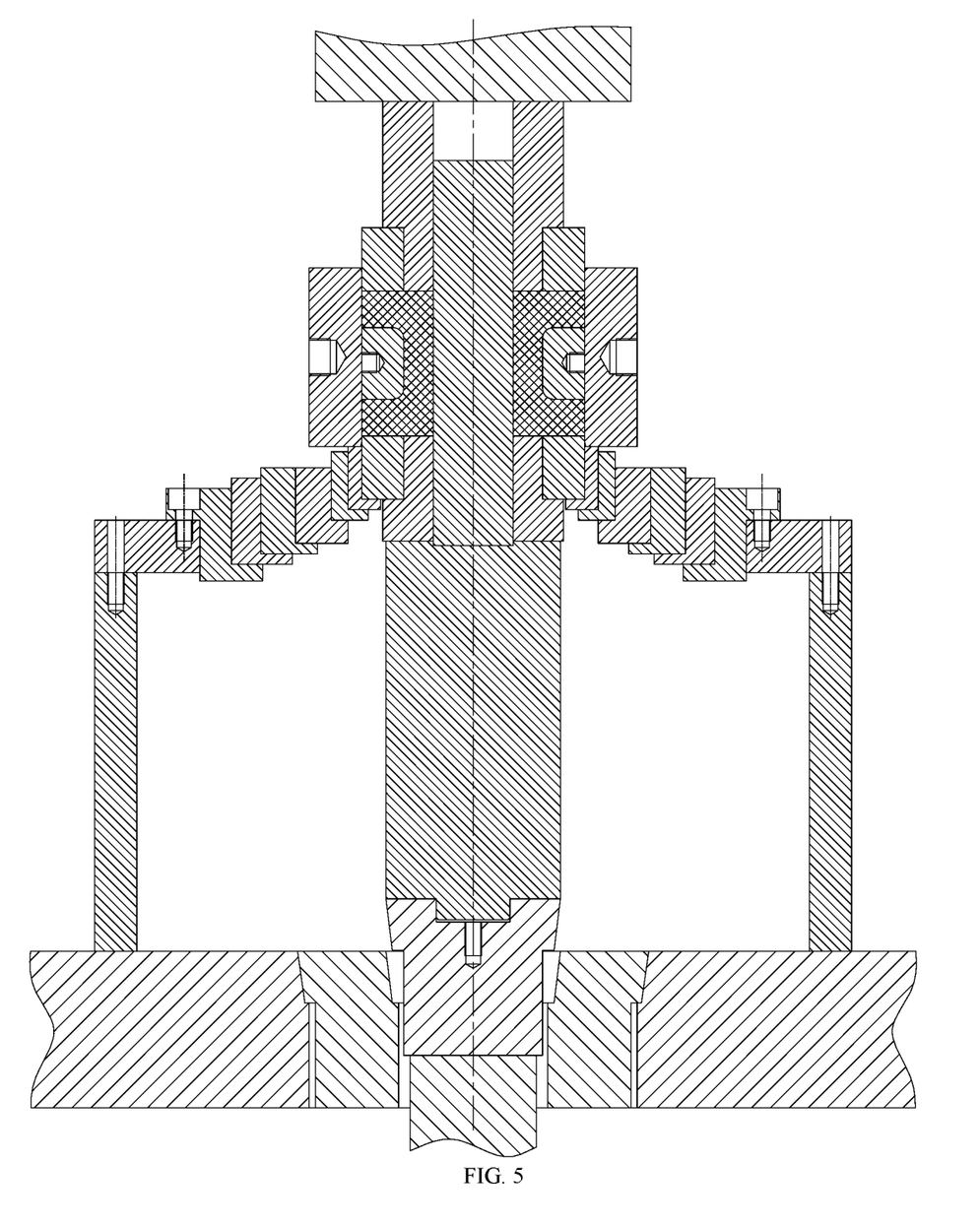
FIG. 5 is a schematic diagram of molding die prior to secondary compression.

Refer to FIGS. 2, 4 and 5. When the outer mold, the upper pressing disc and the lower pressing disc are kept motionless, the upper pressing rod which moves up and down drives the upper mold to move downward by a distance $t2=e(x-1)/2$, and at the same time, the lower ejecting rod which moves up and down drives, through the ejector block and the cushion block, the lower mold and the core mold to move upward by a distance $t1=e(x-1)/2$. At this time, the lower surface of the upper mold is leveled with the lower surface of the upper pressing disc, the step face of the upper mold contacts the upper surface of the upper pressing disc; and the upper surface of the lower mold is leveled with the upper surface of the lower pressing disc, the step face of the lower mold contacts the lower surface of the lower pressing disc.

3), Secondary Compression

Refer to FIGS. 5 and 6. The outer mold is kept motionless; the upper pressing rod moves downward to drive the upper mold and the upper pressing disc to move downward together by a distance $g(x-1)$, and at the same time, the lower ejecting rod moves upward to drive the ejector block, the cushion block, the core mold, the lower and lower pressing disc to move upward together by a distance $g(x-1)$, so as to reach the required size of the I-shaped part. Therefore, the raw materials 10 are compressed to mold the I-shaped part 1.

4), Demolding

Pressure maintaining is required for a period of time after secondary compression, and then demolding proceeds.

Figure 7:
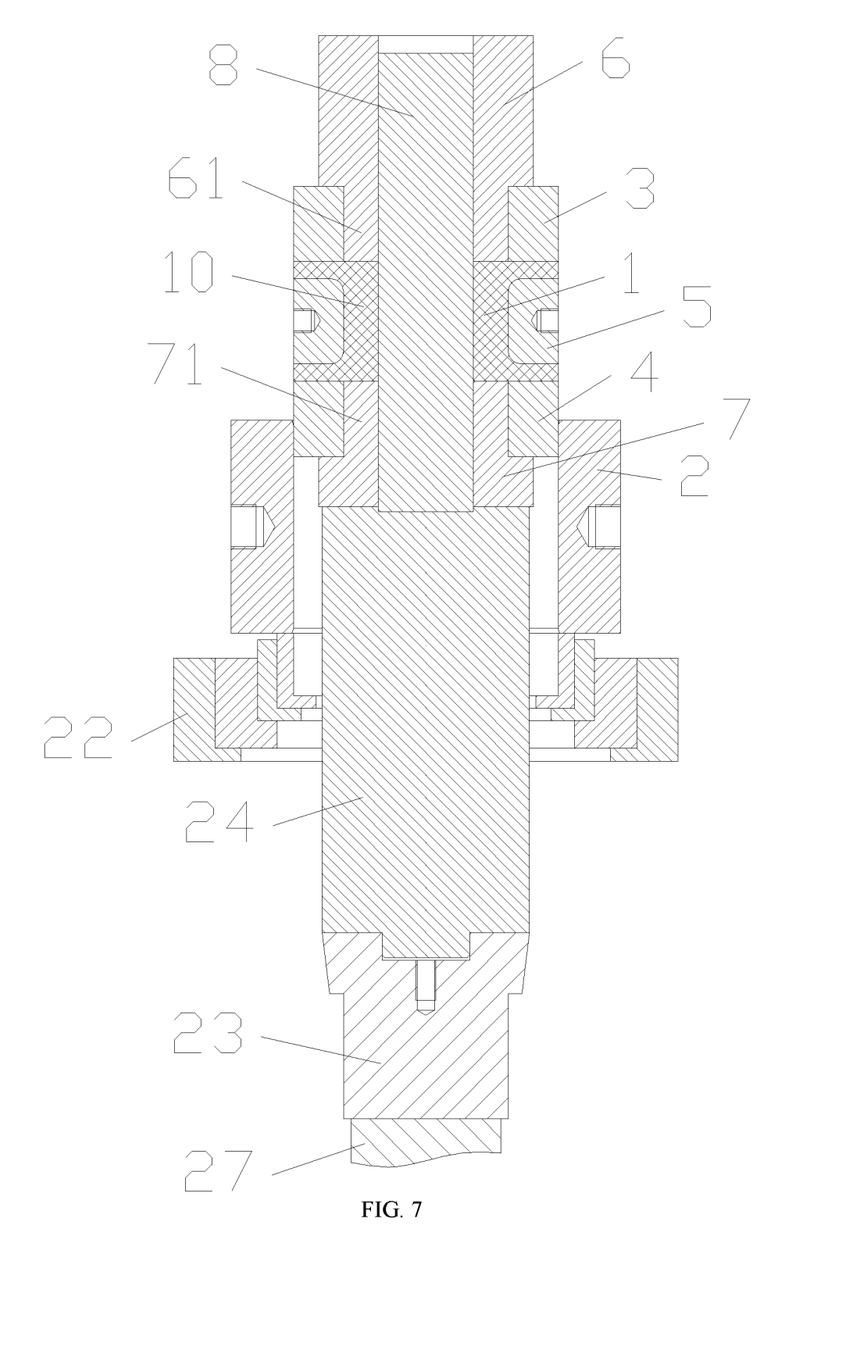
FIG. 7 is a schematic diagram of molding die during demolding.

Refer to FIG. 7. The outer mold is kept motionless; the lower ejecting rod moves upward to drive the upper mold, the upper pressing disc, the huff mold, the lower mold, the lower pressing disc and the core mold to move upward together relative to the outer mold such that the I-shaped part is exposed of the outer mold; the upper mold and the upper pressing disc are taken down first, then the huff mold is taken down, and finally, the I-shaped part is taken down.

What is claimed is:

1. A compression molding die for I-shaped part, the I-shaped part comprises a middle shaft, an upper wing plate and lower wing plate;
   the middle shaft has an outer diameter (f) and a height (e);
   each of the upper wing plate and the lower wing plate has a diameter (d) and a height (g); and,
   (d) is greater than (f) wherein:
   the molding die comprises:
     an outer mold with an inner diameter (d), an upper pressing disc, a lower pressing disc, a huff mold, an upper mold and a lower mold, wherein each of the upper pressing disc, the lower pressing disc and the huff mold has an outer diameter (d) and an inner diameter (f);
     the upper pressing disc, the huff mold and the lower pressing disc are vertically arranged in the outer mold at an interval;
     the upper mold extends into the upper pressing disc;
     the lower mold extends into the lower pressing disc; and
     a mold cavity is surrounded by the outer mold, the upper mold, the upper pressing disc, the huff mold, the lower pressing disc and the lower mold, wherein,
   an outer periphery of a lower end of the upper mold is step-shaped, an axle journal with a smaller diameter at the lower end of the upper mold extends in the upper pressing disc;
   an outer periphery of an upper end of the lower mold is step-shaped, and an axle journal with a small diameter at the upper end of the lower mold extends in the lower pressing disc;
   a plurality of support rings which are nested in turn are provided;
   an annular slot is formed at an upper end of an inner periphery of each of the support rings;
   the support ring with a smaller diameter is nested in the annular slot of the support ring with a greater diameter the lower pressing disc is located in the annular slot of the support ring with the smallest diameter; and
   an axle journal with a greater diameter at an outer periphery of the lower end of the lower mold penetrates through the support ring with the smallest diameter, and the support ring with the greatest diameter is arranged on a mold rack.

2. The compression molding die for I-shaped part, as recited in claim 1, wherein: the I-shaped part has a core hole which runs through the middle shaft, the upper wing plate and the lower wing plate and has a diameter (h); and the molding die further comprises a core mold with a diameter (h), and upper and lower ends of the core mold respectively extend into holes formed on the upper mold and the lower mold.

* * * * *